April 9, 1940.  L. W. WYMAN  2,196,574
PIE PAN
Filed March 20, 1939
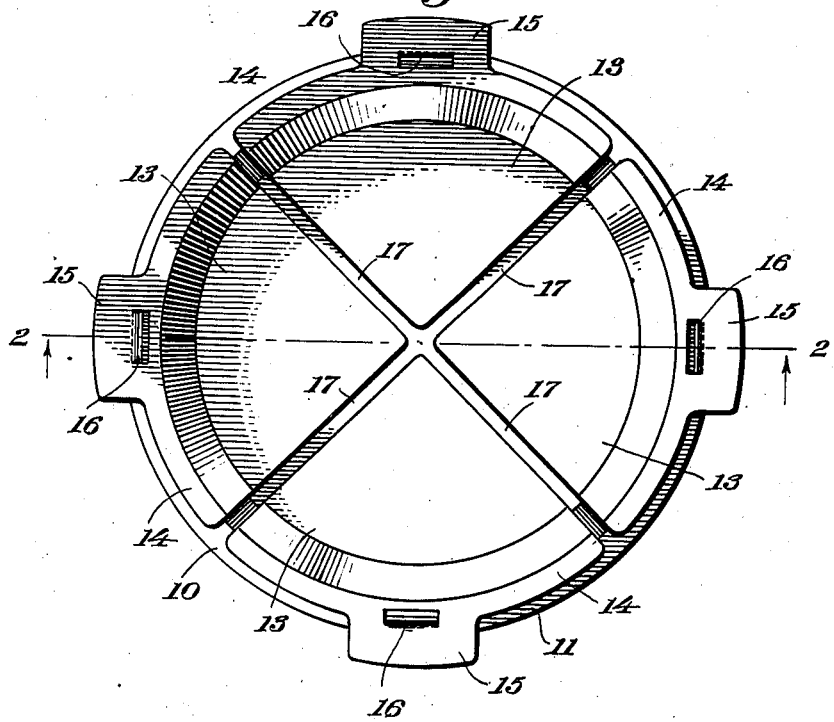
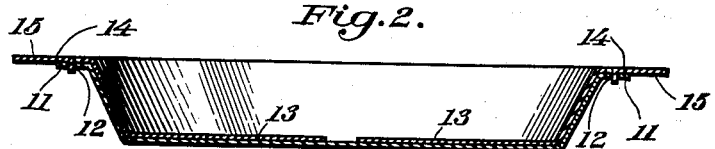
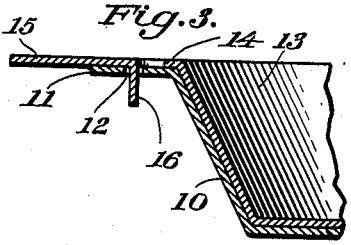
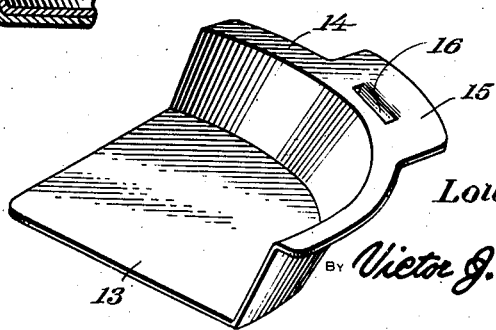
Louis W. Wyman
INVENTOR
BY Victor J. Evans & Co.
ATTORNEYS Patented Apr. 9, 1940

2,196,574

UNITED STATES PATENT OFFICE 2,196,574

PIE PAN

Louis W. Wyman, Silverton, Colo.

Application March 20, 1939, Serial No. 263,033

2 Claims. (Cl. 53—6)

This invention relates to pie pans and has for an object to provide a pie pan having segmental shaped removable sections positively held spaced apart to permit the passing of a knife therebetween in order to cut through the bottom crust of the pie and permit a segment of pie being removed without breaking the same.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification:

Figure 1 is a top plan view of a pie pan constructed in accordance with the invention.

Figure 2 is a cross sectional view of the pie pan taken on the line 2—2 of Figure 1.

Figure 3 is an enlarged detail cross sectional view showing one of the slots in the upper flange of the pie pan and showing one of the sections provided with a tongue engaged in said slots for spacing the section from adjacent sections.

Figure 4 is a perspective view of one of the removable sections of the pie pan.

Referring now to the drawing in which like characters of reference designate similar parts in the various views, 10 designates a pie pan having an upper flange 11 and provided with openings or slots 12 at equally spaced intervals.

The pie pan is provided with a plurality of removable segmental shaped sections 13 adapted to conform in size to the shape of the serving of pie. These sections will vary in number according to the size of the pie. Each section is provided with an upper flange 14 adapted to lie along the upper flange 11 of the pie pan, as best shown in Figure 3. The flange is provided with a lip 15 which projects outwardly from approximately the center of the flange 14 as best shown in Figure 4 and is provided with a downwardly struck tongue 16 adapted to enter a respective opening 12 in the flange of the pie pan. In practice the tongues 16 engage in the openings 12 of the pie pan and positively hold the sections 13 spaced from each other as best shown in Figure 1. The spaces 17 between the sections permit the passing of a knife between the sections to cut the bottom crust of the pie and permit the section of pie so severed being removed unbroken from the remainder of the pie when the removable section 13 is lifted bodily from the pie pan.

From the above description it is thought that the construction and operation of the invention will be fully understood without further explanation.

What is claimed is:

1. A pie pan comprising a pan having a flange, segmental shaped removable sections spaced apart in the pan and having lips engaged upon said flange, and means between the lips and the flange for positively holding the sections spaced apart to permit insertion of a knife therebetween for severing the bottom crust of a pie.

2. A pie pan comprising a pan having a flange, segmental shaped removable sections spaced apart in the pan and having lips engaged upon said flange, said flange having openings therein, and downwardly struck tongues carried by the lips engaged in said opening and positively holding the sections spaced apart to permit insertion of a knife for cutting the bottom crust.

LOUIS W. WYMAN.